CLEMENT W. INGLIS, CHARLES W. INGLIS & B. K. INGLIS.
COUPLING MEMBER.
APPLICATION FILED APR. 21, 1916.
1,214,308.
Patented Jan. 30, 1917.
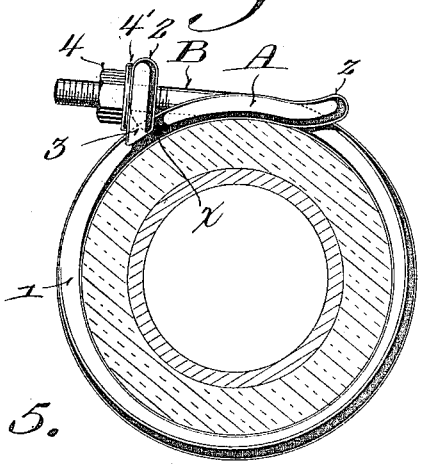
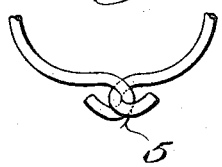
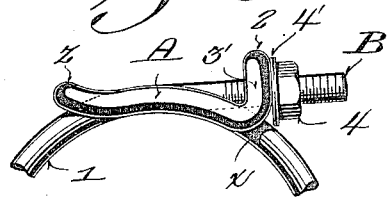
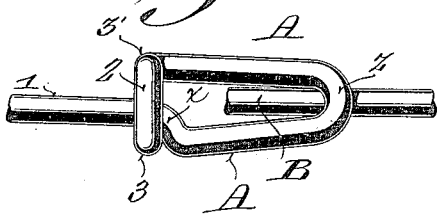
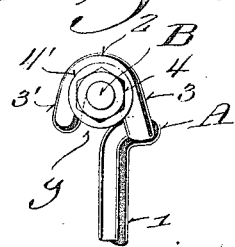

UNITED STATES PATENT OFFICE.

CLEMENT W. INGLIS, CHARLES W. INGLIS, AND BRUCE K. INGLIS, OF MILWAUKEE, WISCONSIN.

COUPLING MEMBER.

1,214,308. Specification of Letters Patent. Patented Jan. 30, 1917.

Application filed April 21, 1916. Serial No. 92,584.

*To all whom it may concern:*

Be it known that we, CLEMENT W. INGLIS, CHARLES W. INGLIS, and BRUCE K. INGLIS, all citizens of the United States, and residents of Milwaukee, in the county of Milwaukee and State of Wisconsin, have invented certain new and useful Improvements in Coupling Members; and we do hereby declare that the following is a full, clear, and exact description thereof.

Our invention has for its object to provide a simple, economical and effective coupling member, the construction and arrangement of which is such that the terminals of a hoop constituting the body of the coupling member are peculiarly formed and overlapped, whereby a binding means associated with the ends will cause a uniform draw or contraction of the hoop about the hose to thus prevent leakage.

Another object of the invention is to provide the terminals with an interlocking throat connection, whereby the coupling can be effected without breaking the hose connections.

A still further object of our invention is to provide a coupling member formed from one piece of wire, whereby the cost of manufacture is materially reduced.

With the above and other minor objects in view the invention consists in certain peculiarities of construction and combination of parts as set forth hereinafter with reference to the accompanying illustrations and subsequently claimed.

In the drawings Figure 1 represents a cross-section through a hose equipped with a coupling member embodying the features of our invention; Fig. 2, a detailed view looking from the other side of the coupling member; Fig. 3, a plan view of the coupling member with parts broken away showing the peculiar formation of the terminals, and Fig. 4, an end view showing the binding mechanism or screw connection between the terminals. Fig. 5 is a view showing a modified form of a coupling member including a hinged hoop facilitating the attachment of the coupling member to the intermediate portion of a hose.

Referring by characters to the drawings, 1 represents a wire hoop having disconnected terminals which overlap each other, as shown. One of the terminals is in the form of a looped tongue A, the return bend of which has an upwardly extended bow 2 which ends with a straight downwardly extended leg 3 that projects below the upper surface of the body portion of the hoop, at which point said body portion is formed with an ogee curve $x$ that merges into the first bend of the tongue A. By this construction it will be seen that where the first leg 3' of the bow springs from the looped tongue it forms a throat $y$ between said tongue member and the ogee curved portion $x$ of the hoop body, which throat is of sufficient width to permit insertion of the end of the straight hoop terminal B. The terminal B, as shown normally lies between the straight stretches of the tongue A and the throat $z$ of said tongue is curved upwardly to clear the terminal B, which terminal passes under said throat. It will also be observed, as shown in Fig. 1, that the stretches of the loop A conform to the inner circular contour of the hoop, whereby they firmly engage the outer wall of the pipe to which they are fitted.

The extreme end of the hoop terminal B extends through the bow 2 and has a threaded end for the reception of a nut 4 which constitutes a binding element for the hoop, there being a washer 4' between the inner face of the nut and the opposed face of the bow.

From the foregoing description it is manifest that when the nut is turned in one direction, it will cause a contraction of the hoop about the hose and the drawing force applied will cause the free end of the tongue A to press downwardly and thus exert a binding force at the joint which is equal to the binding force at any point about the circumference of the hoop, whereby said hoop will contract uniformly throughout its diameter to insure a perfect connection at all points when the hose is drawn down upon a plug or other member for effecting a coupling union. This downward pressure of the tongue upon the surface of the hose is also due to some extent to the engagement of the straight leg 3 of the bow with the ogee shouldered portion at the shank of the tongue.

While we have shown and described a screw and nut connection for the ends of the hoop, whereby said hoop is contracted, this form of connection is preferable, but we may, without departing from the spirit